UNITED STATES PATENT OFFICE.

THOMAS COYLE, OF BALTIMORE, MARYLAND.

IMPROVED MODE OF APPLYING CEMENT IN MAKING CISTERNS, RESERVOIRS, PIERS, &c.

Specification forming part of Letters Patent No. 359, dated August 16, 1837.

*To all whom it may concern:*

Be it known that I, THOMAS COYLE, of the city of Baltimore, State of Maryland, have invented, constructed, made, and applied to use a new and useful Improvement in the Mode of Building and Constructing Cisterns, Reservoirs, Vaults, Chambers of Canals, Bridges, Privies, and for making dry and free from dampness all cellars in wet ground, and for covering all manner of bricks and stone walls for mortar and mason-work in general, called a "compound resinous cement," of which the following is a specification.

The compound resinous cement is composed of one part rosin and two parts dried clay, finely pulverized, the rosin to be put into an iron kettle over a sufficient fire to melt it, after which the clay must be added until it assumes a stoutness of thick plastering-mortar, then thoroughly stirred and boiled until it becomes a dark-brown color and sufficiently elastic that the action of the cold will not cause it to crack, and sufficiently hard that the action of the sun will not cause it, if exposed, to run. These ends may be obtained by judicious boiling. The cement must be always applied while hot, and it will require a hot instrument to spread it.

In forming a wall or vessel of any kind, either to keep in or out water, let a frame be formed of planks or bricks, having a space of sufficient width to form the thickness of the wall intended to be cast, then pour in the cement until the space be filled. When the cement becomes hard the planks can be removed. To prevent the planks from adhering, let paper or some other substance be spread over them, after which, the cement becomes hard, the planks can be removed with ease and dispatch.

In forming a bottom to a cistern or any other vessel care must be taken to cut off all the paper where the joints are formed, or where the hot and the cold cement is intended to be united.

In forming vessels to keep out water it is necessary, first, to find if the gravity of the cement itself will resist the pressure of water. If not, let a sufficient body of clay be put over the cement, and, if necessary, a plank floor well braced over all. It is a general rule to leave a vacancy between the brick or stones sufficient to form an inner space of about an inch. Then grout with the cement, by which means the wall becomes perfectly impervious to water.

In forming the walls or columns of bridges let a box surround the stones forming the wall, pour the boiling cement in in sufficient quantities till the water is disgorged and the foundation-stones reached, which will become as firmly cemented as if there was an absence of all water. For chambers of canals, vaults, privies, and all other vessels the application is the same.

Although I have described the manner of using and applying this cement for various purposes, I wish it to be distinctly understood that I do not claim to be the inventor of the cement itself or of its application to keep out moisture in cellars, vaults, &c.; nor do I claim the application thereof to such purposes in a heated state, this being necessary in all cases and a thing well known; but What I do claim as my discovery is—

The applying it, in places or vessels which contain water, so highly heated as that it shall expel the moisture therefrom, so as effectually to adhere firmly to pebbles, stones, wood, or other substances with which it comes into contact.

In testimony that the above is a true specification of my said improvement, as above described, I have hereunto set my hand this 10th day of August, in the year of our Lord 1837.

THOMAS COYLE.

Witnesses:
OWEN CONNOLLY,
JOHN D. CLARK.